INVENTOR.
HEINZ WILLY ERNST SCHIEPE

INVENTOR.
HEINZ WILLY ERNST SCHIEPE
BY
ATTORNEYS.

United States Patent Office 3,295,703
Patented Jan. 3, 1967

3,295,703
STACKING APPARATUS FOR ELONGATED ELEMENTS SUCH AS MOLDING STRIPS
Heinz Willy Ernst Schiepe, Berlin-Dahlem, Germany, assignor to Firma Maschinenfabrik Stahlkontor Weser Lenze KG, Gross Berkel b. Hameln, Germany
Filed Apr. 21, 1964, Ser. No. 361,489
Claims priority, application Germany, Apr. 27, 1963, Sch 33,191
14 Claims. (Cl. 214—6)

This invention relates to stacking apparatus for elongated elements or workpieces, such as molding strips for example. More particularly, the present invention is directed to a stacking apparatus of this type which is fully automatic in operation and whose operation is independent of variations, within limits, in the cross sectional dimensions of the elements to be stacked.

There are known mechanical stacking devices used for the stacking of boards. One of these known mechanical stacking devices includes gripping or support means arranged to grasp a stack layer and to set the layer down at the stacking place. Another known arrangement involves the use of conveyor belts or chutes which are adjustable to different stacking heights. However, all of these known stacking arrangements require, at least partly, substantial manual operations.

Up to the present time, molding strips, such as used in building construction, have been stacked only by hand. When the stacks become too unstable, intermediate strips are inserted manually between the layers at intervals along the height of the stack. Particular difficulties are encountered when the strips are not identical but have plus or minus tolerances in their width or height. While such tolerances or variations in such cross sectional dimensions are usually compensated over the entire height and width of the stack, the occurrence of individual such variations, in the width or height of a layer of the stack, is an obstacle to mechanical stacking of molding strips.

An object of the present invention is to provide stacking apparatus for elongated elements or workpieces, such as molding strips, which includes vertically oriented conveyor means arranged to pick up elements discharged from a processing operation at one side of the conveyor means and to feed these elements to a stack support means, such as a pallet or the like, positioned on the opposite side of the conveyor means.

Another object of the invention is to provide a stacking apparatus for elongated workpieces which avoids the disadvantages of the prior art and which operates fully automatically.

Still another object of the invention is to provide stacking apparatus of the mentioned type and whose automatic operation is independent of variation in the dimensions of the elements, whether such variations occur in the width or in the height of the individual elements, and which variations otherwise would interfere with the stacking operation.

Still another object of the invention is to provide such a stacking apparatus which receives workpieces, discharged from a processing operation for example, and stacks these workpieces successively in layers, and which, in addition to being operable to stacking molding strips, is equally operable to stack timbers, boards, and planks or the like.

In accordance with the foregoing objects, the mechanical stacking apparatus of the present invention comprises a vertical conveyor means arranged in a substantially upright frame including vertical conveyor means arranged in a substantially upright frame including vertically extending guide members. A delivery table or support means is positioned at a pick up station at one side of this frame, and a conveyor or the like is arranged to discharge workpieces from processing apparatus and to deposit these workpieces on the delivery table. The conveyor means operates, in a step-by-step fashion, responsive to depositing of a workpiece on the support table, to pick up the workpiece and lift it to the top of the frame, transport it horizontally, and then lower the workpiece to a stacking station at the opposite side of the frame.

At the stacking station, carriages are positioned on the guide members of the frame and are adjustable therealong step-by-step in accordance with the increasing height of the stack. These carriages support stack guides which are extendable from a retracted position to the full width of the stack. Means are provided, which are operable responsive to arrival of a workpiece at the stack guides, to displace the workpiece from the conveyor means and to move it onto the stack guides. When a complete layer has been stacked, the stack guides are retracted from the stack and the carriages are automatically adjusted to a higher position in which the stack guides are at level substantially above the upper surface of the just completed layer of the stack. The stack guides are then extended automatically the full width of the stack, and the carriages are automatically lowered until the stack guides are in contact with the upper surface of the just completed layer of the stack. A new layer is then added to the stack in the same manner.

For the purpose of effecting fully automatic operation of the stacking apparatus, the apparatus includes limit switch means, counter means having a limit switch associated therewith, and solenoid mechanisms for operating the various elements of the stacking mechanism. The limit switch means associated with the counting mechanism may be preset to count a number of workpieces for one layer of the stack and, responsive to attainment of this number of workpieces in the layer, this limit switch initiates an automatic cycle of operation which effects the steps just described for positioning the stacking mechanism for adding another layer of the stack. The automatic control means further includes feeler means arranged to sense or feel the position of the carriages with respect to the stack during both the upward and downward adjustment of the carriages, in order to control the extension and retraction of the stack guides.

For an understanding of the principles of the invention, reference is made to the following description of a typical embodiment thereof as illustrated in the accompanying drawings.

In advance of describing the stacking apparatus of the invention in detail, it should be mentioned that the apparatus is not limited to stacking wood workpieces but can stack workpieces of plastic, metal and the like. Furthermore, the apparatus of the invention may include counting means which, responsive to completion of a predetermined or preset number of layers of the stack, may effect mechanical insertion of separation strips between layers of the stack.

Figure 1:
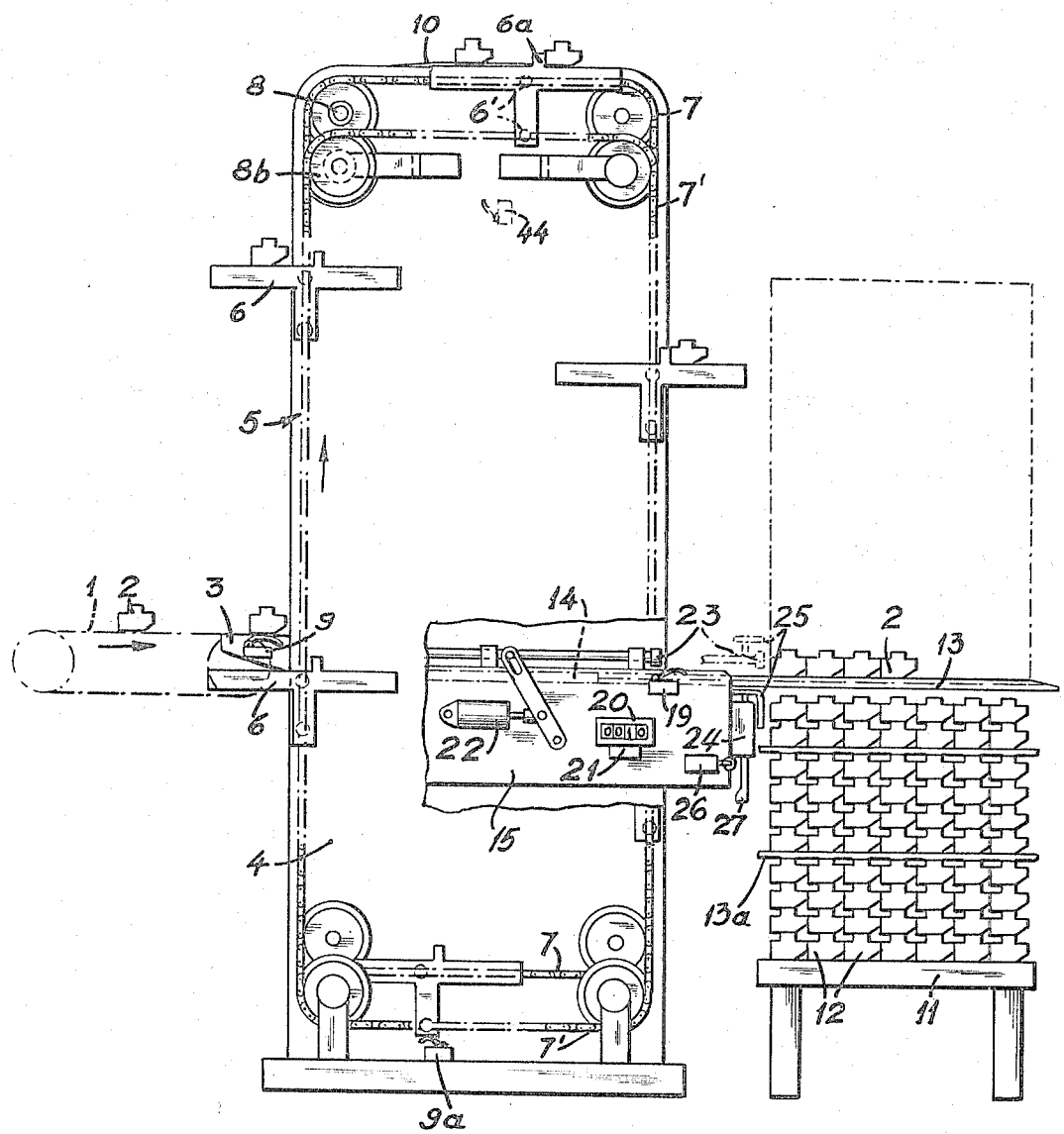
FIG. 1 is a front elevation view, partly broken away, of stacking apparatus embodying the invention.
Figure 2:
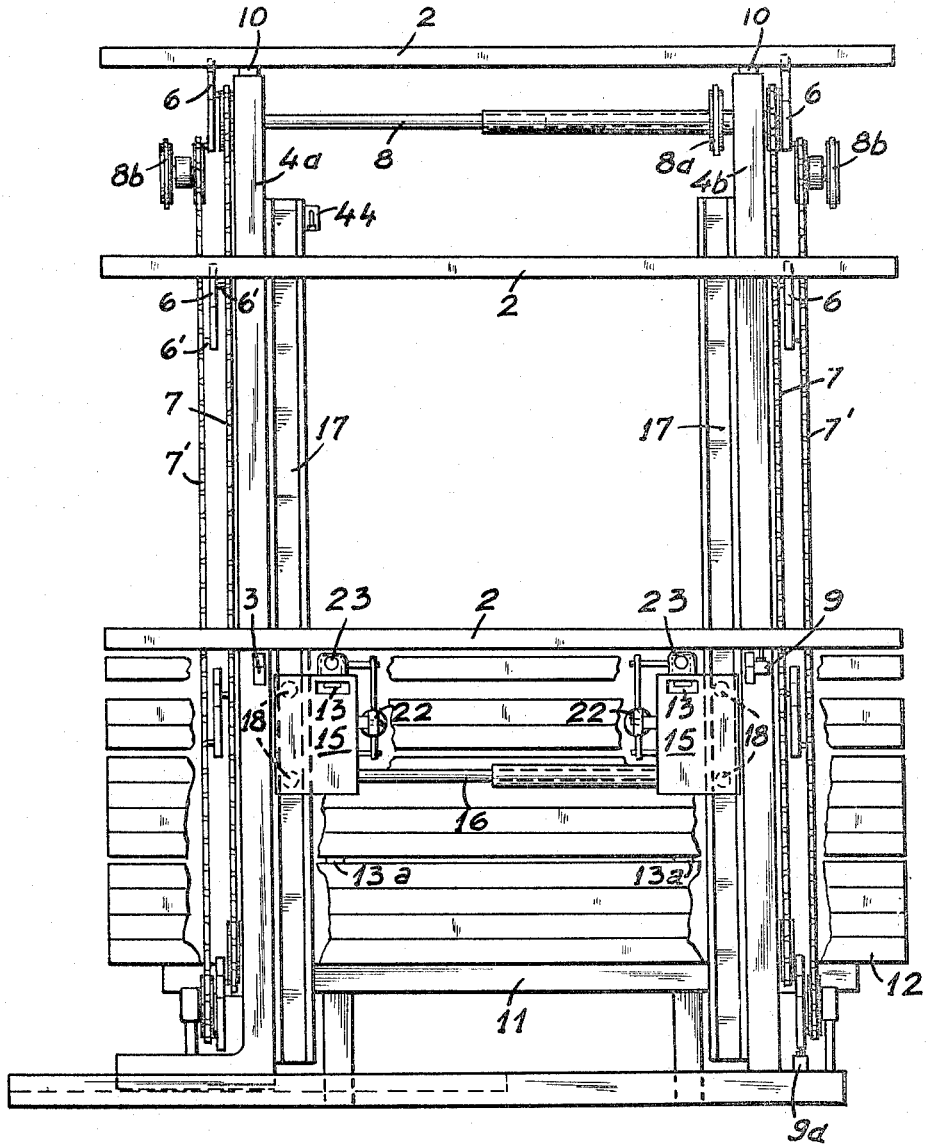
FIG. 2 is a side elevation view, looking toward the stacking side, of the apparatus shown in FIG. 1.

In the particular embodiment of the invention shown in FIGS. 1 and 2, the stacking apparatus is arranged to follow, in an operating cycle, a wood working machine (not shown) which treats or processes the workpieces either longitudinally or transversely. Generally horizontally extending endless conveyor means 1 receive workpieces, such as timbers 2, from the treatment or processing apparatus and feed the workpieces successively to two delivery tables or supports 3 which are adjustable along the upright frame or guide members 4a and 4b (FIG. 2) of the machine frame 4. Frame members 4a and 4b are adjustable, as to lateral spacing, in accordance with the length of the workpieces. Conveyor means 1 operate at a higher speed than that of the delivery means of the processing machine, so as to space or separate successive workpieces 2 brought to the delivery tables or supports 3. Sets of identical apparatus components are associated with each guide member 4a and 4b and, in the following description, only one set of these components will be described in detail.

Referring again to FIGS. 1 and 2, an endless vertically disposed or oriented conveyor generally indicated at 5, is guided in frame 4, and may be advanced step-by-step. Conveyor 5 includes two pairs of endless conveyor chains, one pair of chains being arranged at one side of the stacking device and the other pair being arranged at the other side of the stacking device. Each pair of conveyor chains includes a conveyor chain 7 and a conveyor chain 7'. The vertical runs of all four conveyor chains are equal in length and are laterally aligned, and the horizontal runs of all four chains are equal in length. However, chains 7' are offset vertically with respect to conveyor chains 7 by a predetermined distance for a purpose to be described.

In the particular example illustrated, six pairs of workpiece engaging or pick-up devices 6 are disposed at equal spacings along conveyor 5, with the pick-up devices of each pair being laterally aligned with each other and located at opposite sides of the stacking device. Each pick-up device has two articulated connections 6', one to a conveyor chain 7 and the other to a conveyor chain 7', and the vertical spacing of the two articulated connections is equal to the vertical spacing of the horizontal runs of the associated pair of chains 7 and 7'. Thereby, pick-up devices 6 are always maintained in the horizontal orientation as illustrated in the drawings.

Conveyor chains 7 and 7' are conjointly driven in synchronism by a common drive shaft 8 through the medium of suitable driving means connected to a sprocket 8a secured to the shaft 8, this driving means not having been illustrated. Shaft 8 is a telescoped drive shaft so that it may be extended or contracted axially in accordance with the lateral spacing of guide or frame members 4a and 4b. Each conveyor 7' is driven by a sprocket 8b which is connected to drive shaft 8 by a chain and sprocket drive or the like which has not been illustrated, so that conveyor chains 7' are driven in synchronism with conveyor chains 7.

A limit switch 9 is positioned at delivery table 3 and is actuated by an arriving workpiece 2. Responsive to such actuation, switch 9 energizes the step-by-step driving means of the conveyor, to move the conveyor through one step. One stepwise movement of the conveyor corresponds to the distance between successive pick-up means 6. At the end of this step, the succeeding pick-up device 6 operates a limit switch 9a which de-energizes the driving means for the conveyor 5. During upward movement, a pick-up means 6 arrives at delivery table 3 from beneath and picks up a workpiece 2 deposited thereon to move the workpiece upwardly.

As best seen in FIG. 1, pick-up means 6 are designed bilaterally, or with one half of each pick-up means protruding outwardly from a guide means 4a or 4b and the other half thereof extending inwardly from the path of movement of the conveyor chains. The left portion of each means 6, as viewed in FIG. 1, thus constitutes a workpiece receiving surface, and the right portion constitutes a workpiece discharge surface. Each pick-up means 6 has an adjustable fixed stop 6a intermediate its receiving and discharge surfaces or sections. Just in advance of a change of direction of movement of a pick-up means 6 from a horizontal movement, to the right as shown in FIG. 1, to a downward movement, a workpiece 2 on a pick-up means is moved onto a support ramp 10 located at the upper end of frame 4. The adjustable fixed stop 6a of the succeeding pick-up means 6 engages the workpiece 2 on the support 10 and carries it to the right and downwardly.

On the side of frame 4 opposite to that having delivery tables 3 adjacent thereto, there is disposed a stacking trestle or pallet 11 on which the workpieces or elements 2 are stacked. The superposed layers of stacked elements are indicated at 12. The stacking mechanism includes extendable and retractable stack guides 13 in the form of thin metal rods or of slightly arched steel strips. In the manner described more fully hereinafter, stack guides 13 are extended and retracted between an extended position, in which their outer ends extend beyond the layers 12, and a retracted position, in which the guides 13 have their outer ends retracted clear of the stack elements. Stack guides 13 may be extended and retracted by any suitable driving means, such as a rack and pinion arrangement, a winding drum, or a cylinder-piston drive, this driving means being contained in a housing 14 supported on a carriage 15.

There are two carriages 15 which interconnected by a telescopic shaft 16, and carriages 15 are guided for movement upwardly and downwardly of frame 4 by means of rolls 18 engaging in guides 17 extending in parallel juxtaposed relation with frame components 4a and 4b. The means for vertically adjusting carriages 15 may comprise, for example, a threaded spindle and a nut, such devices being well known for the purpose of raising and lowering elements such as the carriages 15. The details of the carriage lifting and lowering mechanism have been omitted for greater clarity.

The housings 14 slidably supporting the stack guides 13 are located at or near the upper edges of the respective carriages 15. At substantially the level of each housing 14 and its associated stack guide 13, carriage 15 has a pulsing switch 19 mounted thereon and positioned for engagement by workpieces moved downwardly by pick-up means 6. Each time a workpiece engages the operator of switch 19, the latter provides a pulse to a counting mechanism 20. Counting mechanism 20 has a limit switch or contact 21 which is adjustable to preset a desired number of pieces per layer in the stack. Switch 19 also delivers an operating pulse to a solenoid device 22. When energized, solenoid device 22 operates a pusher 23, as best seen in FIG. 1, to move a workpiece 2 from a pick-up means 6 onto the fully extended stack guides 13.

As stated, counting mechanism 20 may be adjusted or preset in accordance with the number of moldings or other pieces corresponding to the stack width, such as the ten pieces shown in FIG. 1. When each tenth strip or workpiece operates pulse switch 19 then, after an electrically timed interval sufficient for the workpiece 2 in contact with pulse switch 19 to be pushed onto stack guides 13 by pusher 23, limit contact or switch 21 energizes a second solenoid device 24.

Solenoid device 24 is located on the edge of carriage 15 adjacent to stack 12. When solenoid 24 is energized, it moves a retainer 25 from a lower or retracted position, shown in solid lines in FIG. 1, to an upper or operative position shown in broken lines. The movable member or armature of solenoid device 24 carries a cam operating means 27 which, during upward movement of the movable member upon energization of solenoid 24, actuates a switch 26. Such actuation of switch 26 provides an initiating pulse for retraction of stack guides 13, and also effects energization of a solenoid device 28, shown in FIG. 3 and described more fully hereinafter.

The feeler device comprises a feeler arm 29 having a feeler roller 30 rotatably mounted at the end thereof adjacent stack 12. A tension spring 31 is connected between the inner or rear end of arm 29 and a fixed point on carriage 15 so as normally to bias arm 29 and its roller 30 to the left as viewed in FIGS. 3, 4 and 5. A relatively elongated rod or bar 33 has its upper end pivotally connected to feeler arm 29 at the pivot point 32, and is formed with slots 34 and 35. A pin 36, connected to one end of the movable ram or armature of solenoid device 28, is engaged in slot 34, and a bolt 37 secured to carriage 15 is engaged in slot 35. By means of bolt 37 engaged in slot 35, arm or rod 33 is pivotally and slidably connected to carriage 15. A tension spring 38 is connected at one end to the lower end of rod or arm 33 and has its opposite end connected to a fixed point on carriage 15, thereby biasing arm or rod 33 upwardly and counterclockwise as viewed in FIGS. 3, 4 and 5. Rolls 39 staggered laterally and longitudinally of feeler arm 29 serve to guide this arm during its movement described hereinafter.

Figure 3:
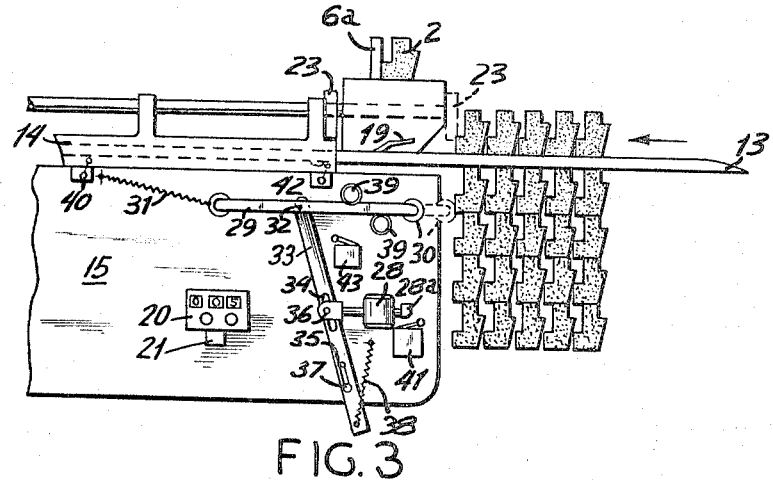
FIGS. 3, 4 and 5 are partial elevation views illustrating different phases of operation of the stacking means.

Normally the parts occupy a position shown in FIG. 3. When solenoid 28 is energized as described, arm 33 is swung clockwise to bias feeler arm 29 to the right to engage roller 30 with the inner edge of stack 12. Pressure is maintained on feeler arm 29 so that feeler roll 30 is maintained in contact with the stack, as it will be noted that the armature of solenoid 28 has not yet moved to the limit of its movement to the right.

At its limit of retraction responsive to operation of switch 26, stack guide 13 actuates a switch 40 which initiates the upward movement of carriage 15 and de-energizes solenoid 24 operating the retainer 25. In its upper or operative position, retainer 25 prevents movement of the stacked workpieces on the uppermost layer to the left during retraction of stack guides 13. Retainer 25 returns to the retracted lower position shown in solid lines in FIG. 1, and carriage 15 is moved upwardly.

Figure 4:
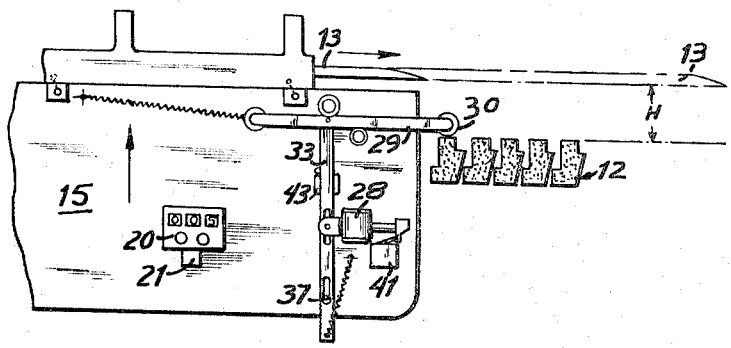

When carriage 15 has been moved upwardly sufficiently far that feeler arm 29 can move outwardly over the upper surface of the uppermost layer of the stack, as illustrated in FIG. 4, a switch 41 is operated by cam 28a on the right-hand end of the armature of solenoid device 28. Such energization of switch 41 provides a pulse de-energizing the drive of carriage 15 and also initiates extension of stack guide 13. Stack guide 13 is moved outwardly from the retracted position shown in solid lines in FIG. 4 to the extended position shown in dotted lines, and in which it extends over the uppermost stack layer at a distance H above the upper surface thereof.

Figure 5:
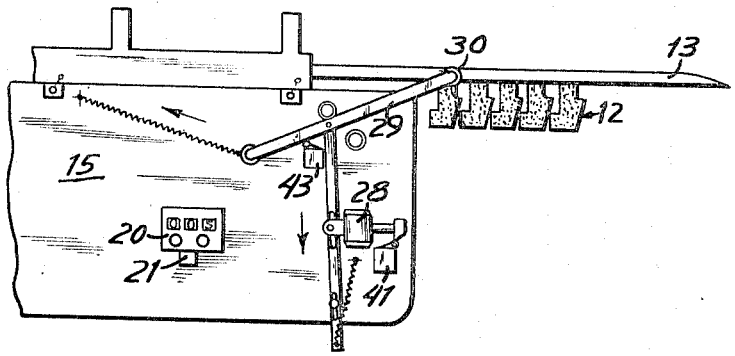

In its fully extended position, stack guide 13 operates a limit switch 42, shown in FIG. 3, which initiates downward movement of carriage 15 in the direction of the arrow of FIG. 5. Feeler roller 30, resting on the uppermost layer of stack 12, forms a pivot for feeler arm 29 so arm 29, as best seen in FIG. 5, swings counterclockwise about the axis of roller 30. In such swinging movement, arm 29 actuates a switch 43 at the same time that stack guide 13 engages the upper surface of the uppermost layer of the stack. When stack guide 13 thus engages the upper surface of the uppermost layer of the stack, the operation of limit switch 43 terminates downward movement of carriage 15 and de-energizes solenoid 28. Stack guide 13 is thus positioned in accordance with the maximum height of the uppermost stack layer. Tension spring 31 now moves feeler arm 29 back into the inoperative position as shown in FIG. 3.

The above described operation, initiated upon a change in layer, and starting with retraction of stack guide 13 and continuing to the time when stack guide 13 is again fully extended, takes about 1.5 seconds. During this short time, the change of the layer of the stacking device is effected and the stack guide has already been extended again to its full extent, spanning the previously uppermost layer of the stack so that stacking of the new layer can be continued. Electrical interlocking between conveyor device 5 and the feeler device prevents disturbances or interruptions which theoretically otherwise could occur during changing of the layer being stacked.

The ultimate stack height is illustrated in broken lines in FIG. 1. When this stack height is obtained, a limit switch 44 is operated by carriage 15 and, after retraction of stack guide 13, this limit switch effects de-energization of the stacking device and energizes an acoustical or optical signal. The loaded stacking trestle or pallet 11 is then removed and replaced by an empty stacking trestle or pallet.

Stack guides 13 can be used for inserting intermediate strips 13a between the layers of the stack. This can be effected automatically at preset intervals by means of a counting mechanism, and the strips 13a may be taken from stock.

It will be appreciated that the stacking apparatus is not limited to the transportation or stacking of only one workpiece at a time. Several workpieces may be transported and stacked alongside each other in dependence upon the stroke of the pushing members 23. Thus, stacking may be effected in accordance with a number of pieces which feeding conveyor 1 supplies from the processing station associated with it.

For relatively short workpieces, only two conveyor stands are necessary while, for longer workpieces, three or more stands may be used instead of the two stands illustrated. If the movements of the apparatus are reversed in analogous manner, the apparatus may be used as a charging device removing material from the stack and depositing it upon conveyor 1 for conveying to treatment apparatus.

While a specific embodiment of the invention has been shown and described in detail to illustrate the application of the principles of the invention, it will be understood that the invention may be embodied otherwise without departing from such principles.

What is claimed is:

1. Apparatus for stacking elongated workpieces comprising, in combination, a stacking station; conveyor means for transporting workpieces to said stacking station; stack support means at said stacking station arranged to support a stack comprising superposed layers of workpieces; a carriage at said stacking station mounted for adjustment vertically of said stack; stack guide means mounted on said carriage for substantially horizontal reciprocation between an extended position, in which said stack guide means extends across said stack to support workpieces during formation of a stack layer, and a retracted position, in which said stack guide means is clear of said stack; pusher means activated, responsive to arrival of a workpiece at said stacking station, to remove a workpiece from said conveyor means onto said stack guide means; counting means pulsed responsive to each arrival of a workpiece at said stacking station; cycle initiating means controlled by said counting means, responsive to counting of a preselected number of workpieces moved onto said stack guide means, to initiate a cycle involving movement of said stack guide means to the retracted position, upward movement of said carriage to elevate said stack guide means to a position above the uppermost layer of said stack, and movement of said stack guide means to the extended position; feeler means movably mounted upon said carriage; means biasing said feeler means into engagement with the lateral surface of said stack, beneath the uppermost layer thereof, responsive to actuation of said cycle initiating means; and means controlled by said feeler means, responsive to a lateral displacement of said feeler means relative to such lateral surface of said stack, regulating the vertically adjusted position of said carriage.

2. Apparatus for stacking elongated workpieces, as claimed in claim 1, said feeler means being disposed at a distance below said stack guide means appreciably greater than the height of a layer of said stack; means operable by said stack guide means, responsive to movement thereof to the retracted position, to initiate upward movement of said carriage; said feeler means biasing means, when said feeler means is at the upper surface of the uppermost layer of said stack, extending said feeler means outwardly across said upper surface; means operable, responsive to such extension of said feeler means, to terminate upward movement of said carriage and to extend said stack guide means to the extended position at a level spaced above the upper surface of the uppermost layer of said stack by a distance greater than the height of a stack layer; and means operable, responsive to movement of said stack guide means to said extended position, to initiate downward movement of said carriage to contact said stack guide means with the upper surface of the uppermost layer of said stack.

3. Apparatus for stacking elongated elements, as claimed in claim 2, including means operable by said feeler means, when said stack guide means contacts the upper surface of the uppermost layer of said stack, to interrupt downward movement of said carriage.

4. Apparatus for stacking elongated workpieces comprising, in combination, a stacking station; conveyor means for transporting workpieces to said stacking station; stack support means at said stacking station arranged to support a stack comprising superposed layers of workpieces; a carriage at said stacking station mounted for adjustment vertically of said stack; stack guide means mounted on said carriage for substantially horizontal reciprocation between an extended position, in which said guide means extends across said stack, and a retracted position, in which said guide means is clear of said stack; said stack guide means, in the extended position, supporting workpieces during formation of a stack layer; means operable, responsive to arrival of a workpiece at said stacking station, to move the workpiece from said conveyor means onto said stack guide means; counting means pulsed responsive to each arrival of a workpiece at said stacking station; triggering means operable by said counting means, responsive to arrival of a preset number of workpieces at said stacking station; cycling means activated by operation of said triggering means to initiate a cycle involving movement of said guide means to the retracted position, upward movement of said carriage to position said guide means at a level spaced from the upper surface of the uppermost layer of said stack, and movement of said stack guide means to the extended position; workpiece retainer means mounted on said carriage and movable to an operative position responsive to operation of said triggering means; feeler means movably mounted on said carriage; and biasing means operable to move said feeler means into operative engagement with said stack responsive to operation of said triggering means.

5. Apparatus for stacking elongated workpieces, as claimed in claim 4, in which said cycling means includes means operable, responsive to operation of said triggering means, to move said retainer means to a position blocking movement of the workpieces of the uppermost layer from said stack; and means operable, responsive to movement of said retainer means to the operative position, to initiate movement of said stack guide means to the retracted position and to energize said biasing means to move said feeler means into engagement with the lateral surface of said stack; said feeler means being positioned on said carriage at a distance below said stack guide means greater than the height of workpieces in a stack layer.

6. Apparatus for stacking elongated workpieces, as claimed in claim 5, in which said feeler means includes a relatively elongated arm; means mounting said arm on said carriage for horizontal reciprocation and also for pivotal movement; means releasibly restraining said arm to a horizontally and retracted position; said biasing means, when said feeler means is at the level of the upper surface of said uppermost layer, moving said arm horizontally to extend over such upper surface; means operable, responsive to such extended movement of said arm, to interrupt upward movement of said carriage and to move said stack guide means to the extended position at a distance above the upper surface of said uppermost layer greater than the height of the workpieces; means operable responsive to movement of said stack guide means to the extended position to initiate downward movement of said carriage; said arm, during downward move of said carriage pivoting about its contact with the upper surface of said uppermost layer; and means operable, responsive to such pivoting of said arm, and when said stack guide means contacts the upper surface of said uppermost layer, to interrupt downward movement of said carriage and to de-energize said feeler means biasing means for retraction of said feeler means.

7. Apparatus for stacking elongated workpieces, as claimed in claim 6, in which said biasing means for said feeler means comprises a solenoid having a movable armature; a link pivotally connected at one end to said arm of said feeler means and slidably and pivotally mounted on said carriage; means slidably and pivotally connecting said armature to said link; said armature being moved only partially to its limiting operated position, by energization of said solenoid, when said feeler means contacts the lateral surface of said stack, and moving to its limiting operated position when said feeler means is moved across the uppermost layer of said stack; said means for initiating downward movement of said carriage being operated by said armature in its limiting operated position.

8. Apparatus for stacking elongated workpieces, as claimed in claim 6, in which said means interrupting downward movement of said carriage and de-energizing the biasing means for said feeler means comprises a switch having an operator positioned in the path of pivotal movement of said arm.

9. Apparatus for stacking elongated workpieces, as claimed in claim 6, in which said means pivotally and slidably mounting said arm comprises a pair of rolls on said carriage engaged with respective opposite normally horizontal surfaces of said arm, said rolls being spaced longitudinally of said arm; and a roller on that end of said arm nearer said stack, for engagement with said stack.

10. Apparatus for stacking elongated workpieces, as claimed in claim 6, including first and second switches operable by said stack guide means, said first switch being operable by said stack guide means in the retracted position thereof and said second switch being operable by said stack guide means in the extended position thereof; said first switch constituting said means initiating upward adjustment of said carriage and said second switch constituting said means initiating downward movement of said carriage.

11. Apparatus for stacking elongated elements comprising, in combination, a vertically oriented substantially rectangular framework including upper and lower horizontal members and laterally spaced first and second vertical members; a pick-up station adjacent said first vertical member; a stacking station at an adjustable fixed elevation adjacent said second vertical member; an endless conveyor extending around said framework and having upper and lower horizontal runs and a pair of vertical runs each associated with one of said vertical frame members; pick-up devices secured to said endless chain conveyor at substantially uniformly spaced positions therealong for transport of workpieces from said pick-up station to said stacking station; a stack support at said stacking station arranged to support a stack comprising superposed layers of workpieces; automatic means at said stacking station arranged to remove arriving workpieces from said pick-up devices and to stack the arriving workpieces in uniform superposed layers on said stack support; means operatively interconnecting said conveyor means and said pick-up devices and maintaining said pick-up devices in a horizontal orientation throughout the path of said conveyor; each pick-up device extending to opposite sides of the vertical members of said framework, and each including a receiving portion extending toward said pick-up station and a discharge portion extending toward said stacking station; the receiving portions of said pick-up devices projecting beneath the workpieces at said pick-up station to pick-up workpieces from the latter during upward movement of the pick-up devices; support means positioned at the upper horizontal member of said framework in the path of movement of workpieces carried by the receiving portions of the pick-up devices and effective to lift a workpiece from a receiving portion of a pick-up device and to retain the lifted workpiece; upwardly projecting abutment means on each pick-up device positioned between the receiving and discharge portions thereof; the upwardly projecting abutment means of a pick-up device following one from which a workpiece has been lifted by said support means, moving the lifted workpiece from said support means onto the discharge portion of said following pick-up device for movement downwardly to said stacking station.

12. Apparatus for stacking elongated workpieces comprising, in combination, a stacking station; a stack support at said station arranged to support a stack comprising superposed layers of workpieces; a carriage at said station mounted for adjustment vertically of said stack; stack guide means on said carriage extendable across said stack to support workpieces during formation of a stack layer; conveyor means for transporting workpieces to said stacking station; means operable to remove thus transported workpieces from said conveyor means and onto said stack guide means; and means operable, responsive to positioning of a preselected number of workpieces on said stack guide means, to retract said stack guide means away from said stack, to adjust said carriage vertically of said stack to position said stack guide means above the uppermost layer of said stack, and to extend said stack guide means across said stack for formation of another stack layer, including means electrically interlocking the operation of said conveyor means and the adjustment of said carriage and repositioning of said guide means.

13. Apparatus for stacking elongated workpieces comprising, in combination, a stacking station; a stack support at said station arranged to support a stack comprising superposed layers of workpieces; a carriage at said station mounted for adjustment vertically of said stack; stack guide means on said carriage extendable across said stack to support workpieces during formation of a stack layer; conveyor means for transporting workpieces to said stacking station; means operable to remove thus transported workpieces from said conveyor means and onto said stack guide means; and means operable, responsive to positioning of a preselected number of workpieces on said stack guide means, to retract said stack guide means away from said stack, to adjust said carriage vertically of said stack to position said stack guide means above the uppermost layer of said stack, and to extend said stack guide means across said stack for formation of another stack layer, in which said stack guide means are operable to insert spacer strips between a pair of adjacent layers of said stack.

14. Apparatus for stacking elongated workpieces, as claimed in claim 4, in which said conveyor means includes an endless conveyor; a pick-up station adjacent said conveyor means and spaced from said stacking station; and a further endless conveyor positioned at an adjustable fixed elevation and delivering workpieces to said pick-up station for transport by said first endless conveyor to said stacking station.

References Cited by the Examiner
UNITED STATES PATENTS

| | | |
|---|---|---|
| Re. 24,124 | 2/1956 | Pierce. |
| 1,958,133 | 5/1934 | Delany. |
| 2,403,942 | 7/1946 | Mathers _____ 214—6.1 |
| 2,875,908 | 3/1959 | Woodcock. |
| 3,128,889 | 4/1964 | Johnson. |
| 3,169,646 | 2/1965 | Mason. |

GERALD M. FORLENZA, *Primary Examiner.*

MORRIS TEMIN, J. OLDS, *Assistant Examiners.*